UNITED STATES PATENT OFFICE.

HENRY MIELCK AND FERDINAND C. VON HEYDEBRAND, OF GARFIELD, NEW JERSEY, ASSIGNORS OF ONE-THIRD TO JOHN KARL, OF GARFIELD, NEW JERSEY.

WATER AND AIR PROOF COMPOSITION OF MATTER.

977,423.  Specification of Letters Patent.  Patented Nov. 29, 1910.

No Drawing.  Application filed May 4, 1910.  Serial No. 559,309.

*To all whom it may concern:*

Be it known that we, HENRY MIELCK, a citizen of the United States of Brazil, and FERDINAND C. VON HEYDEBRAND, a citizen of the United States of America, both residing in Garfield, in the county of Bergen and State of New Jersey, have invented certain new and useful Improvements in Water and Air Proof Composition of Matter, of which the following is a specification.

This invention relates to an improved composition of matter which is to be used for rendering paper for cement and other bags, lining paper for barrels, coating of gas-tubes and fire-hose, engine-packing and other articles water and airproof, and which can also be used as a coating for damp floors, walls of cellars, structural iron, iron vessels, for rendering the same water-tight; and for this purpose the invention consists of an air and waterproof composition of matter made of a liquid mixture containing gutta-percha or caoutchouc, asphaltum, heavy hydro-carbons, such as tar, pitch, resin and earth-wax, filling material such as starch, dextrin, glycerin, and China wood or nut oil.

In preparing our composition of matter for rendering paper and other articles water and airproof, the following ingredients are mixed while boiling in the succession and proportions as follows:

1000 parts by weight of tar
100 " " " " guttapercha or caoutchouc,
50 " " " " asphaltum,
50 " " " " pitch,
100 " " " " resin,
50 " " " " earth-wax or ozokerite,
30 " " " " starch,
20 " " " " dextrin,
4 " " " " glycerin,
6 " " " " China wood or tung oil.

The tar, asphaltum, pitch and earth-wax serve as a rubber substitute so as to reduce the expense of the composition and impart the required consistency to the same. The starch serves as a filler, the dextrin to impart the adhesive property, and the resin as a drier, while the glycerin keeps the composition flexible, and the China nut or wood oil in connection with the caoutchouc or gutta-percha imparts the waterproof quality to the composition, the substances impregnated with the same and to the objects treated, coated or painted with the same.

The ingredients are boiled together and intimately mixed with each other up to the proper consistency as required for the different uses, the proportions of resin being varied according as a more or less easily flowing and drying mass is desired.

The paper or other articles are impregnated with an easily flowing liquid and then permitted to dry, while for gas-tubes, fire-hose and packing a layer of thicker liquid is required.

The proportions of the ingredients can be changed according to the object for which the composition is to be used. For some purposes a thin liquid, while for other purposes a liquid of a pasty consistency, and for still other purposes a thick liquid is required.

The composition after it is applied to the articles, dries quickly when applied in thin state, and more slowly when applied in thick state. The objects impregnated, saturated or coated with the liquid composition of matter are rendered perfectly water and airproof, the composition remaining flexible, without becoming brittle, which is due to the caoutchouc and glycerin employed, while the tar, asphaltum and pitch and the China nut oil impart the waterproof quality to the same and form to some extent a substitute for the more expensive caoutchouc or gutta-percha, so that a rubberlike property is imparted to the composition which has the advantage of being considerably cheaper than the rubber-compounds, and not liable to decomposition and deterioration as the same.

Having thus described our invention, we claim as new and desire to secure by Letters Patent:

1. An air and waterproof composition of matter, consisting of a liquid mixture of tar, caoutchouc, asphaltum, liquid and solid hydrocarbons, a filling material, glycerin, and China wood or tung oil.

2. An air and waterproof composition of matter, consisting of a liquid mixture of tar, caoutchouc, asphaltum, liquid and solid hydrocarbons, a filling substance, a drier, glycerin, and China wood or tung oil.

3. An air and waterproof composition of matter, consisting of a liquid mixture of tar, caoutchouc, asphaltum, pitch, earth-wax, resin, starch, dextrin, glycerin, and China wood or tung oil.

In testimony, that we claim the foregoing as our invention, we have signed our names in presence of two subscribing witnesses.

HENRY MIELCK.
FERDINAND C. VON HEYDEBRAND.

Witnesses:
PAUL GOEPEL,
FANNIE FISK.